United States Patent
Meisel et al.

(10) Patent No.: US 8,315,023 B2
(45) Date of Patent: Nov. 20, 2012

(54) RESIDUAL-CURRENT CIRCUIT BREAKER

(75) Inventors: Rainer Meisel, Vienna (AT); Georg Ritzinger, Wolfpassing (AT)

(73) Assignee: Moeller Gebäudeautomation GmbH, Schrems (AT)

( * ) Notice: Subject to any disclaimer, the term of this patent is extended or adjusted under 35 U.S.C. 154(b) by 169 days.

(21) Appl. No.: 12/628,554

(22) Filed: Dec. 1, 2009

(65) Prior Publication Data
US 2010/0134222 A1 Jun. 3, 2010

Related U.S. Application Data

(60) Provisional application No. 61/119,147, filed on Dec. 2, 2008.

(30) Foreign Application Priority Data

Dec. 2, 2008 (AT) .................................. 1872/2008

(51) Int. Cl.
*H02H 3/16* (2006.01)
(52) U.S. Cl. .......................................... 361/42; 361/44
(58) Field of Classification Search ............... 361/42–50
See application file for complete search history.

(56) References Cited

U.S. PATENT DOCUMENTS

| 4,280,162 A | 7/1981 | Tanka et al. | |
|---|---|---|---|
| 2005/0212505 A1* | 9/2005 | Murray et al. | 324/126 |
| 2005/0270717 A1* | 12/2005 | Zipagan | 361/115 |

FOREIGN PATENT DOCUMENTS

| EP | 0 349 880 A1 | 1/1990 |
|---|---|---|
| EP | 0 755 108 A1 | 1/1997 |
| EP | 0 866 536 A2 | 9/1998 |
| EP | 1 267 467 A2 | 12/2002 |
| EP | 1 478 069 A1 | 11/2004 |
| EP | 1 478 070 A1 | 11/2004 |
| EP | 1 693 943 A2 | 8/2006 |
| GB | 2 176 069 A | 12/1986 |
| JP | 10309031 A | 11/1998 |

\* cited by examiner

*Primary Examiner* — Danny Nguyen
(74) *Attorney, Agent, or Firm* — Henry M. Feiereisen LLC

(57) ABSTRACT

A residual-current circuit breaker includes a summation current transformer having a core, a first secondary winding wound onto the core, and at least one second secondary winding wound onto the core, with lines of an electric network to be protected extending through the core. A tripping apparatus is operably connected to break contacts for opening the break contacts. A first arrangement is provided for detecting alternating residual currents and connected to the first secondary winding of the summation transformer. A second arrangement is connected to the second secondary winding for detecting direct residual currents, wherein a predeterminable alternating operation of the first and second arrangements is controlled by a timer device.

20 Claims, 1 Drawing Sheet

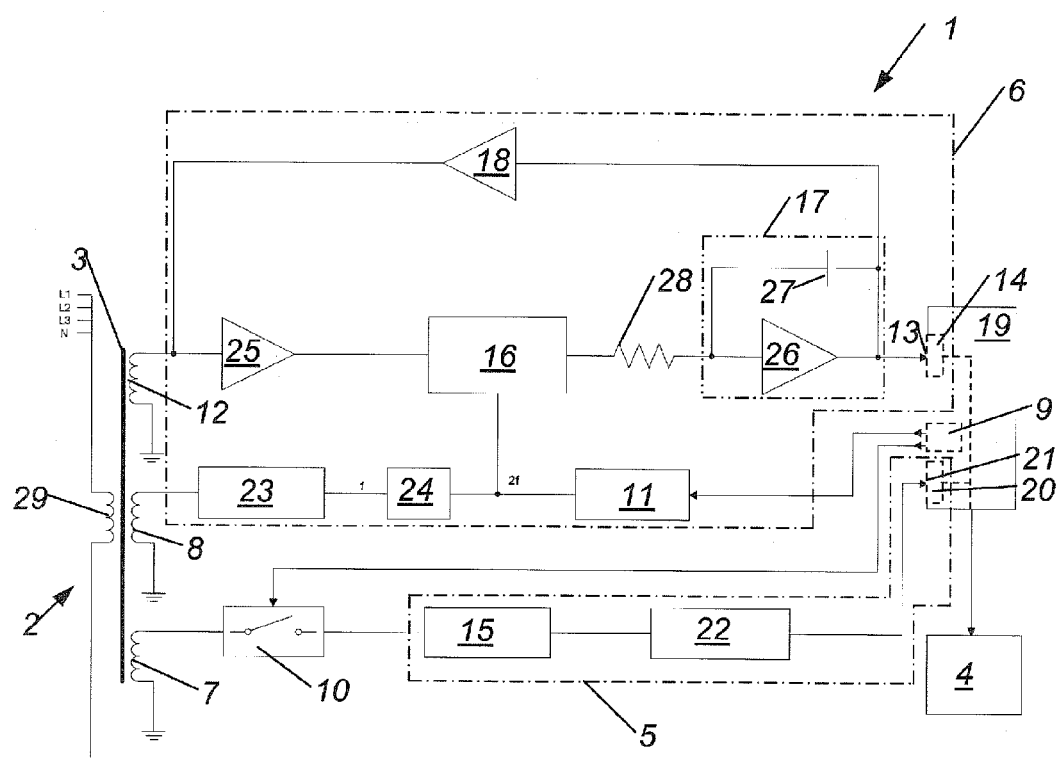

RESIDUAL-CURRENT CIRCUIT BREAKER

CROSS-REFERENCES TO RELATED APPLICATIONS

This application claims the benefit of prior filed U.S. provisional Application No. 61/119,147, filed Dec. 2, 2008, pursuant to 35 U.S.C. 119(e), the content of which is incorporated herein by reference in its entirety as if fully set forth herein.

This application also claims the priority of Austrian Patent Application, Serial No. A 1872/2008, filed Dec. 2, 2008, pursuant to 35 U.S.C. 119(a)-(d), the content of which is incorporated herein by reference in its entirety as if fully set forth herein.

BACKGROUND OF THE INVENTION

The present invention relates, in general, to a residual-current circuit breaker and to a method for detecting direct residual currents and alternating residual currents in a residual-current circuit breaker.

The following discussion of related art is provided to assist the reader in understanding the advantages of the invention, and is not to be construed as an admission that this related art is prior art to this invention.

Residual-current circuit breakers are known which are arranged for detecting alternating residual currents and for detecting direct residual currents. Such residual-current circuit breakers comprise two completely separated residual-current detection devices which have a separate summation current transformer. Summation current transformers represent both one of the most expensive and bulky modules within a residual-current circuit breaker. Moreover, one needs to be exceptionally careful in processing the same because mechanical stresses on the core of a summation current transformer can have a negative effect on its functionality.

It would therefore be desirable and advantageous to provide an improved residual-current circuit breaker which obviates prior art shortcomings and which can be produced in a simple and cost-effective manner and which requires little space and is yet reliable in operation.

SUMMARY OF THE INVENTION

According to one aspect of the present invention, a residual-current circuit breaker includes a summation current transformer having a core, a first secondary winding wound onto the core, and at least one second secondary winding wound onto the core, with lines of an electric network to be protected extending through the core, break contacts, a tripping apparatus operably connected to the break contacts for opening the break contacts, a first arrangement for detecting alternating residual currents, with the first arrangement being connected to the first secondary winding, a second arrangement for detecting direct residual currents, with the second arrangement being connected to the second secondary winding, and a timer device controlling a predeterminable alternating operation of the first and second arrangements.

The present invention resolves prior art problems by providing a residual-current circuit breaker which merely includes a single summation current transformer for detecting alternating residual currents and for detecting direct residual currents. It is also possible with such a residual-current circuit breaker having only one single summation current transformer to detect alternating residual currents and direct residual currents. The costs for such a residual-current circuit breaker can be kept low by eliminating the need for an addition summation current transformer. Moreover, the residual-current circuit breaker is compact and does not require more space than a conventional residual-current circuit breaker which is merely constructed for detecting alternating residual currents. A residual-current circuit breaker in accordance with the invention is able to provide protection from residual currents with frequencies between 0 Hz, i.e. direct current, and very high frequencies, using only a single summation current transformer.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic circuit diagram of a residual-current circuit breaker according to the present invention;

DETAILED DESCRIPTION OF PREFERRED EMBODIMENTS

The depicted embodiment is to be understood as illustrative of the invention and not as limiting in any way. It should also be understood that the figures are not necessarily to scale and that embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the sole FIGURE, there is shown a schematic circuit diagram of a residual-current circuit breaker according to the present invention, generally designated by reference numeral 1. The residual-current circuit breaker 1 with a summation current transformer 2, with lines L1, L2, L3, N of an electric network to be protected passing through a core 3 of the summation current transformer 2, and with the residual-current circuit breaker 1 further comprising a tripping apparatus 4 and break contacts, and the tripping apparatus 4 being in operative connection with the break contacts for opening the same, with the residual-current circuit breaker 1 having a first arrangement 5 for detecting alternating residual currents and a second arrangement 6 for detecting direct residual currents, with the first arrangement 5 being connected by means of circuitry with a first secondary winding 7 and with the second arrangement 6 being connected by means of circuitry with at least one second secondary winding 8, with the first and at least one second winding 7, 8 being arranged on one and the same core 3, and that the residual-current circuit breaker 1 comprises a timer device 9 which controls a predeterminable alternating operation of the first arrangement 5 and the second arrangement 6.

A residual-current circuit breaker 1 can thus be formed which is arranged both for detecting alternating residual currents and for detecting direct residual currents, and which comprises merely one summation current transformer 2, and a detection of alternating residual currents and direct residual currents can be achieved with merely one single summation current transformer 2. The costs for such a residual-current circuit breaker 1 can be kept low by omitting a further summation current transformer 2. Furthermore, such a residual-current circuit breaker 1 does not need more space than a conventional residual-current circuit breaker 1 which is arranged for detecting merely alternating residual currents. In a residual-current circuit breaker 1 in accordance with the invention, protection from residual currents with frequencies between 0 Hz, which is direct current, and very high frequencies can be achieved with merely one summation current transformer 2.

The sole FIGURE shows merely a preferred embodiment of a residual-current circuit breaker 1 in accordance with the invention as a schematic view of the functional modules. Such a residual-current circuit breaker 1 is provided for the protection of installations and humans, with the consumers connected to the residual-current circuit breaker 1 being disconnected in the case of an occurring dangerous residual current from a supply network comprising the conductors L1, L2, L3, N which are merely shown in the FIGURE in the region of summation current transformer 2 as merely one line. The residual-current circuit breaker 1 further comprises terminals (not shown), especially screw terminals, for connecting the conductors L1, L2, L3, N of an electric supply network. The illustrated schematic circuit diagram shows an embodiment with three external conductors L1, L2, L3 and a neutral conductor N. It is possible to provide embodiments with any predeterminable number of lines or conductors of an electric power supply network.

The residual-current circuit breaker 1 further comprises break contacts (not shown) for predeterminable breaking or interrupting the conductors L1, L2, L3, N. The break contacts are triggered by the tripping apparatus 4, advantageously constructed as a permanent magnet trip, and are in an at least indirect operative connection with the same. The break contacts can be actuated by a breaker mechanism (not shown) which is triggered by the tripping apparatus 4. The components or modules described or shown in the FIGURE are each jointly arranged in a housing with insulating material which comprises breakthroughs at least for the terminals and a manually actuated manual switching lever for manually opening or closing the break contacts. It can further be provided that a residual-current circuit breaker 1 in accordance with the invention comprises further modules or components (not shown or described) such as a switching position display, a tripping display and the like.

A residual-current circuit breaker 1 in accordance with the invention comprises a single summation current transformer 2 for detecting direct residual currents, therefore DC-like residual currents, and alternating residual currents, therefore AC-like residual currents. It is possible to arrange further summation current transformers 2 for further tasks that go beyond this within a residual-current circuit breaker 1 in accordance with the invention. The summation current transformer 2 comprises a core 3 which is preferably made of a magnetically soft material, preferably a magnetically soft toroid core. The conductors L1, L2, L3, N are guided through the core 3 of the summation current transformer 2 as primary winding 29. It can both be provided that the conductors L1, L2, L3, N are wound about the core 3, or are simply guided through the same only once. At least one first and one second secondary winding 7, 8 are arranged on the one core 3, or are wound about the cross section of the core 3.

The first secondary winding 7 is connected by circuitry with a first arrangement 5 which is arranged for detecting alternating residual currents. The first arrangement 5, which is illustrated in the FIGURE by a dot-dash region marked with reference numeral 5, comprises a first measuring unit 20 which is arranged as a measuring unit dependent on line voltage in accordance with the illustrated preferred embodiment. An analog-to-digital converter is arranged on the first measuring input 21 of the first measuring unit 20, in which converter the incoming analog alternating residual current signal is converted into the value-discrete and time-discrete digital form with a predetermined scanning frequency and predetermined resolution. This enables a further evaluation of the alternating residual current fault signal by means of methods of digital signal analysis. An alternating residual current signal detected by the first secondary winding 7 is amplified in a first preamplifier 15 and passes an anti-aliasing filter 22, which is therefore a low-pass filter, which is switched between the first preamplifier 15 and the first measuring input 21. The alternating residual current signal is compared with respective comparison or limit values in the first measuring unit 20, which may be part of a microcontroller 19, which comparison or limit values can also take into account the different effect of electric currents with different frequencies. When one of the predeterminable limit values of an alternating residual current signal is exceeded, e.g. a limit value for heart ventricle fibrillation in a human, the first measuring unit 20 triggers the tripping apparatus 4 at least indirectly. It is also possible to provide other arrangements of such a first arrangement 5, which have been described in large numbers in the state of the art.

A residual-current circuit breaker 1 in accordance with the invention further comprises a second arrangement 6 for detecting direct residual currents, which second arrangement is connected by means of circuitry with the second secondary winding 8. A timer device 9 controls the alternating operation of the first and second arrangement 5, 6. As long as the first arrangement 5 is in operation, the second arrangement 6 therefore remains switched off or deactivated, and as long as the second arrangement 6 is in operation, the first arrangement 5 is switched off or deactivated. It is preferably provided for this purpose to arrange a switch 10 in the circuit connection of the first arrangement 5 with the first secondary winding 7, which switch is triggered by the timer device 9. The switch 10 can be arranged by means of circuitry at any point of the connection between the first secondary winding 7 and the first measuring input 21. The signal path from the first secondary winding 7 to the first measuring input 21 is interrupted by opening switch 10, and the first arrangement 5 is deactivated in this manner.

The second arrangement 6 which is illustrated in the FIGURE by the dot-dash region designated with reference numeral 6 comprises a second measuring unit 14 which is arranged as a measuring unit dependent of line voltage according to the illustrated preferred embodiment. An analog-to-digital converter is arranged in which the incoming analog direct residual current signal is converted into value- and time-discrete digital form with a predetermined scanning frequency and predetermined resolution. This enables a further evaluation of the direct residual current fault signal by means of methods of digital signal analysis.

The second arrangement 6 comprises an oscillator unit 11 which is connected by means of circuitry with the second secondary winding 8 and which is triggered by the timer device 9. The second arrangement 6 can be activated or deactivated by triggering or activating the oscillator unit 11. A predeterminable, alternating, offset-free signal with a predeterminable number of harmonics, preferably a rectangular signal or a saw-tooth signal, is generated in the oscillator unit 11 and it is transmitted to the second secondary winding 8. A predeterminable non-linear magnetization of core 3 of the summation current transformer 2 can thus be achieved. The signal generated in the oscillator unit 11 is amplified in a driver stage 23 prior to the triggering of the second secondary winding 8. A frequency divider 24 is further provided to divide the signal generated in the oscillator unit 11 in a predeterminable manner, preferably halves the same. This fact is illustrated by the statement of 2f before the frequency divider 24 and of f after the same. This offers advantages which will be explained further below in the present explanations. The soft-magnetic core 3 of the summation current transformer 2 is periodically driven to saturation by the signal of the oscillator unit 11, with the magnetization characteristic of such a core material being non-linear.

A third secondary winding 12 is arranged on the core 3, which winding is connected indirectly by circuitry with the second measuring input 13. When a direct residual current occurs, a DC magnetic field is superimposed on the alternating magnetic field generated by the secondary winding 8, through which a residual current signal is generated in the third secondary winding 12 which comprises frequency components in the even harmonics of the signal of the oscillator unit 11, with the amplitudes of the even harmonics being proportional to the direct residual current. In particular, an amplification of the first even harmonic of the signal of the oscillator unit 11 occurs here, which is why the thus detected residual current signal comprises a highly distinct frequency component at 2f. It is therefore advantageously provided for determining the direct residual current that the amplitude of the residual current signal is evaluated at the first even harmonic of the signal of the oscillator unit 11.

The third secondary winding 12 is connected at least indirectly with an input of a synchronous detector 16. It can be provided that a second preamplifier 25 is switched before the input of the synchronous detector 16 in order to amplify the residual current signal of the third secondary winding 12. The synchronous detector 16 is provided or arranged for detecting the first even harmonic in the residual current signal of the third secondary winding 12, comprises a circuit connection to the oscillator unit 11 and is supplied by the same with the originally generated signal which has the frequency of the first even harmonic to be detected because it has not yet passed the frequency divider 24.

It can be provided that the output of the synchronous detector 16 is applied directly to the second measuring input 13. Advantageously, one output of the synchronous detector 16 is connected by circuitry with an input of an integrating unit 17 whose output is connected with the second measuring input 13. The integrating unit 17 is illustrated in the FIGURE by a double-dot and dash line. As a result of this integrating unit 17 which is arranged in a preferable way and as illustrated by an operational amplifier 26 and a capacitor 27, the residual current signal which occurs during a period length or its first even harmonic can be added up. It can be provided that a resistor 28 is switched between the output of the synchronous detector 16 and the input of the integrating unit 17.

In order to expand the dynamic range of the direct residual current to be detected a control loop is formed between the third secondary winding 12 and the second measuring input 13. A control variable of the control loop is applied to the second measuring input 13. It is especially provided that the output of the integrating unit 17 is connected with one input of a transconductance amplifier 18 and that one output of the transconductance amplifier 18 is connected at least indirectly by means of circuitry with the input of the synchronous detector 16 or with the input of an optionally provided second preamplifier 25. A transconductance amplifier 18 converts the voltage signal applied to the output of the integrating unit 17 into a current signal. The first even harmonic to be detected can thus be amplified explicitly by this feedback branch.

The residual current signal which is detected in this manner and is proportional to an occurring direct current signal is compared in the second measuring unit 14 with respective comparison or limit values. When a predeterminable limit value of an alternating residual current signal is exceeded, e.g. a limit value for heart ventricle fibrillation in humans, the second measuring unit 24 triggers the tripping apparatus 4 at least indirectly. The first and second measuring unit 20, 14 and the timer device 9 are implemented at least in sections as part of at least one processor, especially a microprocessor, or at least one controller, especially a microcontroller 19, and are shown in the FIGURE as symbolic boxes within the microcontroller 19 with broken lines, with the individual connections between these units being shown in a symbolic manner in order to illustrate the functional connections. It can be provided to implement parts of the described functionality as a logical hardware arrangement in a PLD or FPGA for example, or by controlling the functions of a processor or controller.

As already explained, the activation of the first arrangement 5, with simultaneous deactivation of the second arrangement 6, is controlled for a predeterminable first period of time, and the activation of the second arrangement 6, with simultaneous deactivation of the first arrangement 5, is controlled for a predeterminable period of time by the timer device 9 which is preferably constructed as a timer. As already explained above, the timer device 9 is constructed as a part of a processor or controller. This is advantageous because a processor or controller usually comprises a so-called system clock, and therefore comprises or provides an internal time-dependent control signal which can also be used for arranging the timer device 9.

The timer device 9 is therefore arranged for keeping open the switch 10 in the second period of time and for keeping closed the switch 10 in the first period of time, which is why switch 10 is closed during the first period of time and opened during the second period of time. At the same time and conversely, the timer device 9 is arranged for activating the oscillator unit 11 in the second period of time and for deactivating the oscillator unit 11 in the first period of time. That is why the oscillator unit 11 is activated by the timer device during the second period of time and therefore generates a predeterminable output signal and is deactivated during the first period of time. Advantageously, the first and second periods of time each follow directly, and are therefore interrupted in their sequence at best by the processor-induced runtime delay.

The concrete time lengths of the first and second period of time are determined by the requirements placed on the frequency resolution of the residual-current circuit breaker 1 or the frequency resolution of the used analog-to-digital converters. Advantageously, the first period of time is between 50 ms and 200 ms, preferably between 75 ms and 150 ms, and the second period of time is between 0.5 ms and 2 ms, preferably between 0.75 ms and 1.5 ms. The first period of time can last 100 ms and the alternating residual current signal is scanned with 200 kHz. As a result, alternating residual currents can be detected with a frequency of 10 Hz to 100 kHz. The second period of time lasts 1 ms however. The oscillator unit generates a signal with 10 kHz for ten oscillation periods. Residual currents with a frequency of 0 Hz to 10 Hz are detected thereby. The detection of direct residual currents or residual currents with very low frequencies occurs every 100 ms. Alternating residual currents are detected during these 100 ms.

A method for detecting direct residual currents and alternating residual currents in a residual-current circuit breaker 1 with merely one signal summation current transformer 2 are arranged in such a way that in a first step merely alternating residual currents are measured in a first period of time and in a subsequent second step merely direct residual currents in a second period of time, thus enabling the achievement of the advantages as already explained above of a residual-current circuit breaker in accordance with the invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A residual-current circuit breaker, comprising:
   a summation current transformer having a core, a first secondary winding wound onto the core, and at least one second secondary winding wound onto the core, with lines of an electric network to be protected extending through the core;
   break contacts;
   a tripping apparatus operably connected to the break contacts for opening the break contacts;
   a first arrangement for detecting alternating residual currents, said first arrangement connected to the first secondary winding;
   a second arrangement for detecting direct residual currents, said second arrangement being connected to the second secondary winding; and
   a timer device controlling a predeterminable alternating operation of the first and second arrangements.

2. The residual-current circuit breaker of claim 1, further comprising a switch disposed in a connection of the first arrangement with the first secondary winding and triggered by the timer device.

3. The residual-current circuit breaker of claim 1, wherein the second arrangement includes an oscillator unit connected with the second secondary winding to cause a predeterminable alternating magnetization of the core.

4. The residual-current circuit breaker of claim 3, wherein the magnetization of the core is soft magnetic.

5. The residual-current circuit breaker of claim 3, wherein the oscillator unit is controlled by the timer device.

6. The residual-current circuit breaker of claim 1, wherein the summation transformer has a third secondary winding which is arranged on the core, said second arrangement being connected to the third secondary winding.

7. The residual-current circuit breaker of claim 6, further comprising a measuring unit having a measuring input, said third secondary winding being connected, at least indirectly, with the measuring input of the measuring unit.

8. The residual-current circuit breaker of claim 7, further comprising a control loop formed between the third secondary winding and the measuring input, said control loop having a control variable which is applied to the measuring input of the measuring unit.

9. The residual-current circuit breaker of claim 7, further comprising a synchronous detector having an input connected, at least indirectly, with the secondary winding, and an integrating unit having an input connected to an output of the synchronous detector and an output connected with the measuring input of the measuring unit.

10. The residual-current circuit breaker of claim 9, further comprising a transconductance amplifier having an input connected to the output of the integrating unit, and an output connected at least indirectly with the input of the synchronous detector.

11. The residual-current circuit breaker of claim 1, wherein the timer device includes a timer for activating the first arrangement with simultaneous deactivation of the second arrangement for a predeterminable first period of time, and for activating the second arrangement with simultaneous deactivation of the first arrangement for a predeterminable second period of time.

12. The residual-current circuit breaker of claim 11, wherein the first period of time is between 50 ms and 200 ms and the second period of time is between 0.5 ms and 2 ms.

13. The residual-current circuit breaker of claim 11, wherein the first period of time is between 75 ms and 150 ms.

14. The residual-current circuit breaker of claim 11, wherein the second period of time is between 0.75 ms and 1.5 ms.

15. The residual-current circuit breaker of claim 11, further comprising a switch disposed in a connection of the first arrangement with the first secondary winding and triggered by the timer device, said timer device being constructed to keep the switch open in the second period of time and to keep the switch closed the first period of time.

16. The residual-current circuit breaker of claim 11, wherein the second arrangement includes an oscillator unit connected with the second secondary winding to cause a predeterminable alternating magnetization of the core, said timer device being constructed to activate the oscillator unit in the second period of time and to deactivate the oscillator unit in the first period of time.

17. The residual-current circuit breaker of claim 1, wherein at least one member selected from the group consisting of first arrangement, second arrangement, and timer device is implemented at least in sections as a part of a processor or a controller.

18. The residual-current circuit breaker of claim 17, wherein the processor is a microprocessor.

19. The residual-current circuit breaker of claim 17, wherein the controller is a microcontroller.

20. A method for detecting direct residual currents and alternating residual currents in a residual-current circuit breaker with a single summation current transformer, comprising the steps of:
   measuring in a first arrangement alternating residual currents with the summation current transformer; and
   measuring in a second arrangement direct residual currents with the summation current transformer; and
   controlling a predeterminable alternating operation of the first and second arrangement with a timer device.

* * * * *